Apr. 3, 1923.
H. E. TIMMIS
1,450,526
COUPLING APPLIANCES FOR TRAILER VEHICLES, TILLING IMPLEMENTS, AND THE LIKE
Filed Feb. 15, 1922
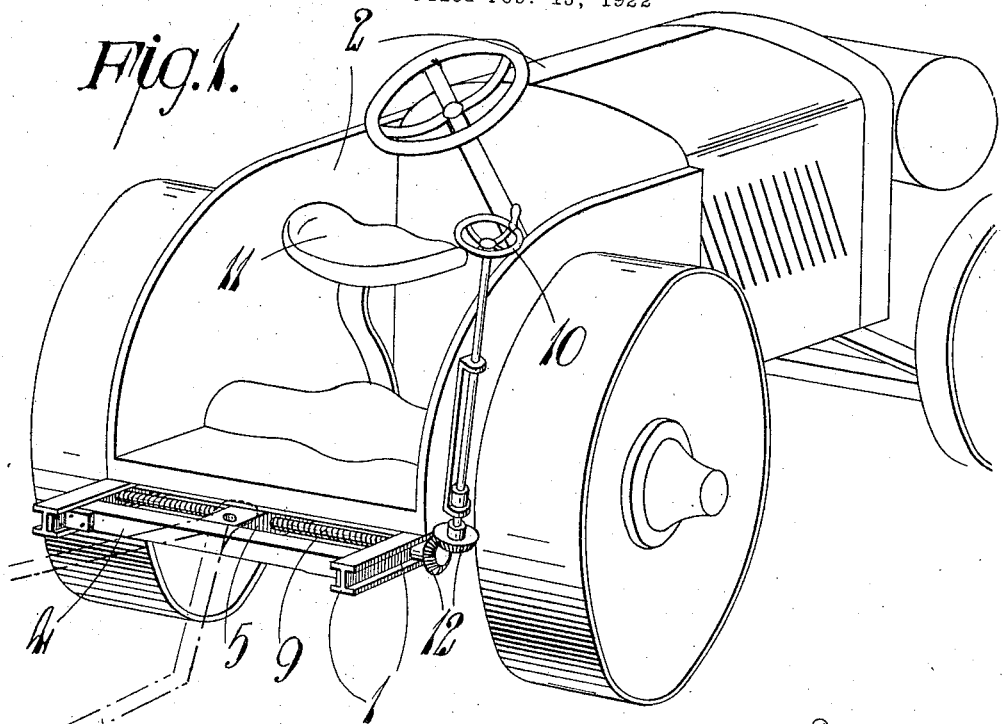
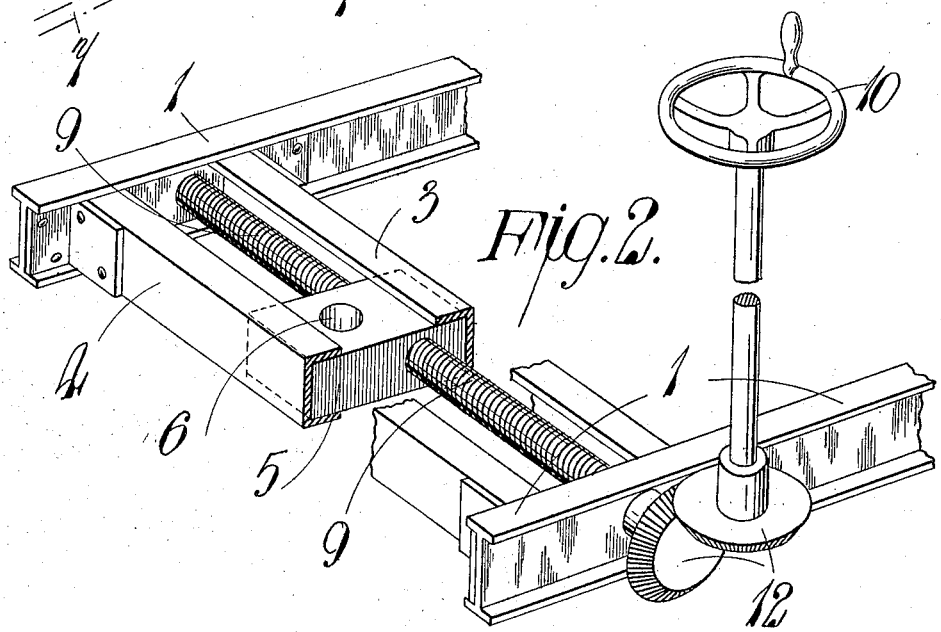
Inventor.
Harold Edgar Timmis,
By B. Singer, Atty.

Patented Apr. 3, 1923.

1,450,526

UNITED STATES PATENT OFFICE.

HAROLD EDGAR TIMMIS, OF DUBLIN, IRELAND.

COUPLING APPLIANCES FOR TRAILER VEHICLES, TILLING IMPLEMENTS, AND THE LIKE.

Application filed February 15, 1922. Serial No. 536,822.

*To all whom it may concern:*

Be it known that I, HAROLD EDGAR TIMMIS, a subject of the King of Great Britain, residing at Dublin, Ireland, have invented certain new and useful Improvements in or Relating to Coupling Appliances for Trailer Vehicles, Tilling Implements, and the like; and I do hereby declare the following to be a full, clear, and exact description of the same.

This invention relates to the steering of trailer vehicles, tilling implements and the like and has for its object to provide means which will enable the trailer or other vehicle or implement to be backed without uncoupling and to negotiate very sharp corners, which is particularly desirable when in conjunction with tilling implements as it allows the land at the corners of fields, which is usually left uncultivated, to be tilled and thus utilized.

According to this invention the device comprises a coupling member mounted on the drawing or tractor vehicle and connected to the draw bar or the equivalent of the drawn or trailer vehicle or implement, the coupling member being movable transversely of the vehicle to change the direction of the pulling or thrust force and thereby steer the trailing vehicle or implement.

Referring to the drawings:—

Figure 1 is a perspective view of a tractor according to this invention.

Figure 2 is a similar fragmental view of the rear part thereof to an enlarged scale.

In carrying my invention into practice as illustrated upon the accompanying drawings the device is carried by a sub-frame 1 mounted on the rear of the tractor vehicle 2. This frame may comprise a pair of transverse channel or I section joists 3, 4 which are secured to any suitable part, say, for instance, the rear axle base of the tractor by the longitudinal members of the sub-frame 1.

These joists are so arranged as to provide guides within which the coupling member 5 is conveniently mounted.

The coupling member 5 is in the form of a block, and has suitable means such as the hole 6 for the attachment of the usual draw bar 7 of the vehicle to be trailed, not shown.

This coupling member is provided with a threaded hole 8 to receive a corresponding threaded rod 9 transversely disposed in bearing in the end members of the sub-frame.

The rod is adapted to move the block transversely in the guides of the sub-frame, and for this purpose it is operated by a hand wheel 10 located near the driver's seat 11 and arranged to rotate the rod through the medium of suitable gearing such as indicated at 12.

By rotating the hand wheel the coupling member is moved transversely, thus altering the point of application of the pulling or thrust force and consequently the direction, thereby steering the vehicle trailed both in a forward and backward direction.

It will be understood that any suitable number of vehicles may be trailed in this manner, in which case a separate device would be provided for each vehicle to be trailed and with separate operating means.

The device does not necessitate any structural alteration in the trailer vehicles now employed and is extremely simple.

In conclusion it may be specifically pointed out that the whole apparatus can be worked by a single man and in the case of the first trailer by the driver of the tractor vehicle, thus effecting a great saving in labour.

What I claim then is:—

1. A coupling device for vehicles comprising a transversely disposed screw, rotatably mounted at the rear of the tractor vehicle; means for rotating the said screw; a coupling block having a central portion which is operably mounted upon the said screw and two extending end portions which are adapted to be guided; means carried by the central portion of the block for the attachment of the draw bar of a tractor vehicle; and a pair of channel guides which surround and totally enclose said end portions of the block, being located one on each side of the screw; whereby all rearwardly extending attachment means are dispensed with.

2. A coupling device for vehicles comprising a transversely disposed screw; rotatably mounted at the rear of the tractor vehicle; means for rotating the said screw; a coupling block operably mounted on the screw, having an opening in its centre portion for the reception of the draw bar of the trailer vehicle; and a pair of channel guides for the said block located one on each side of the screw, surrounding and totally enclosing each end of the block; whereby all exterior projecting attachment means are dispensed with.

In witness whereof I affix my signature.

HAROLD EDGAR TIMMIS.